Aug. 15, 1967    J. N. STUTZ    3,335,911
BEVERAGE BLENDING MACHINERY
Filed April 13, 1965    2 Sheets-Sheet 1
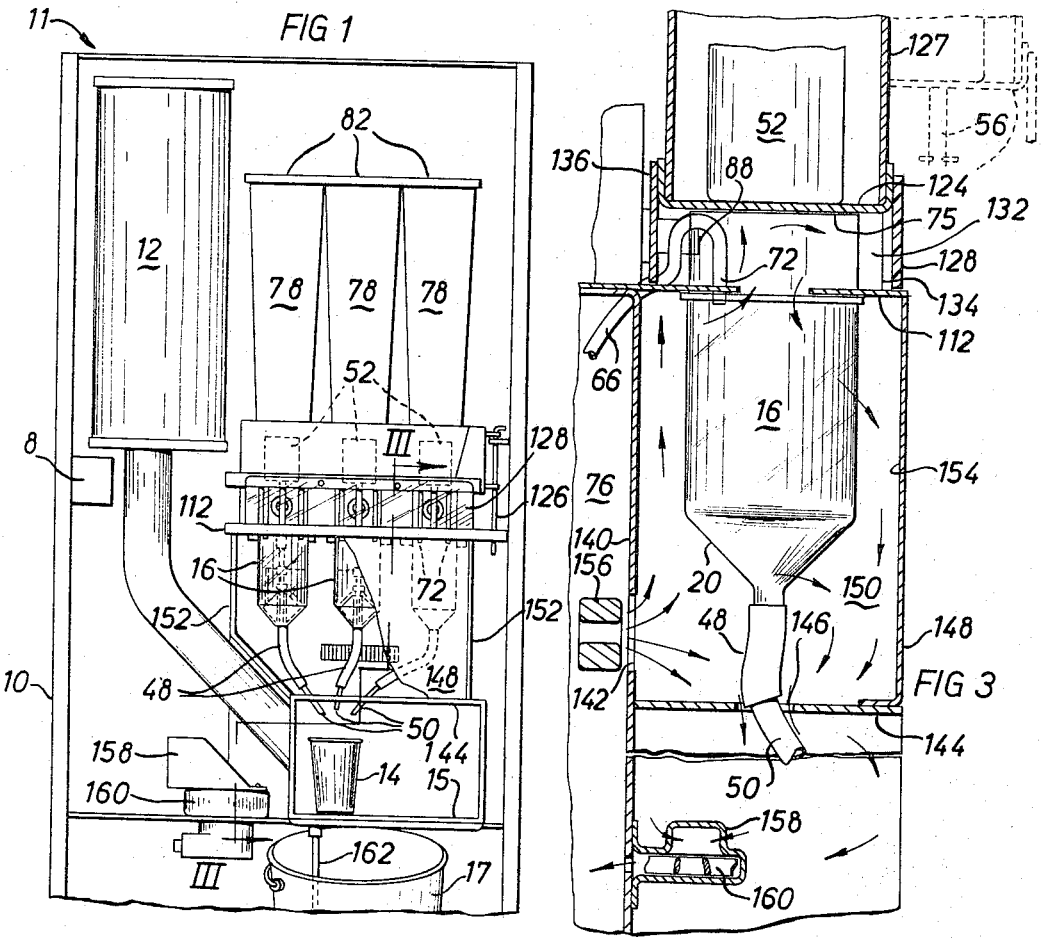
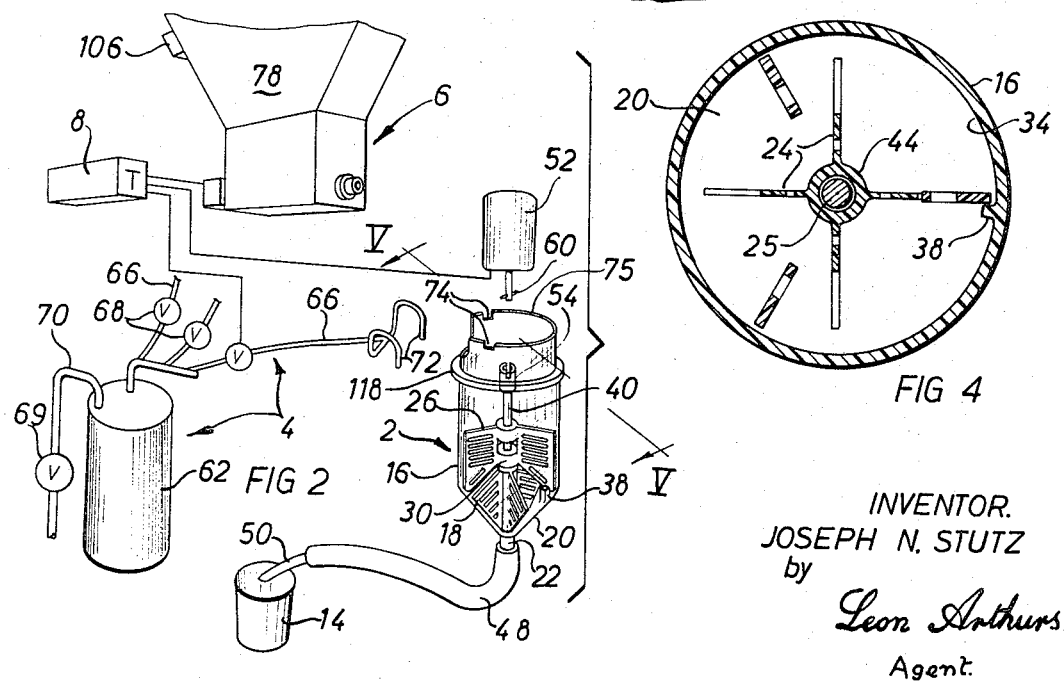
INVENTOR.
JOSEPH N. STUTZ
by
Leon Arthurs
Agent.

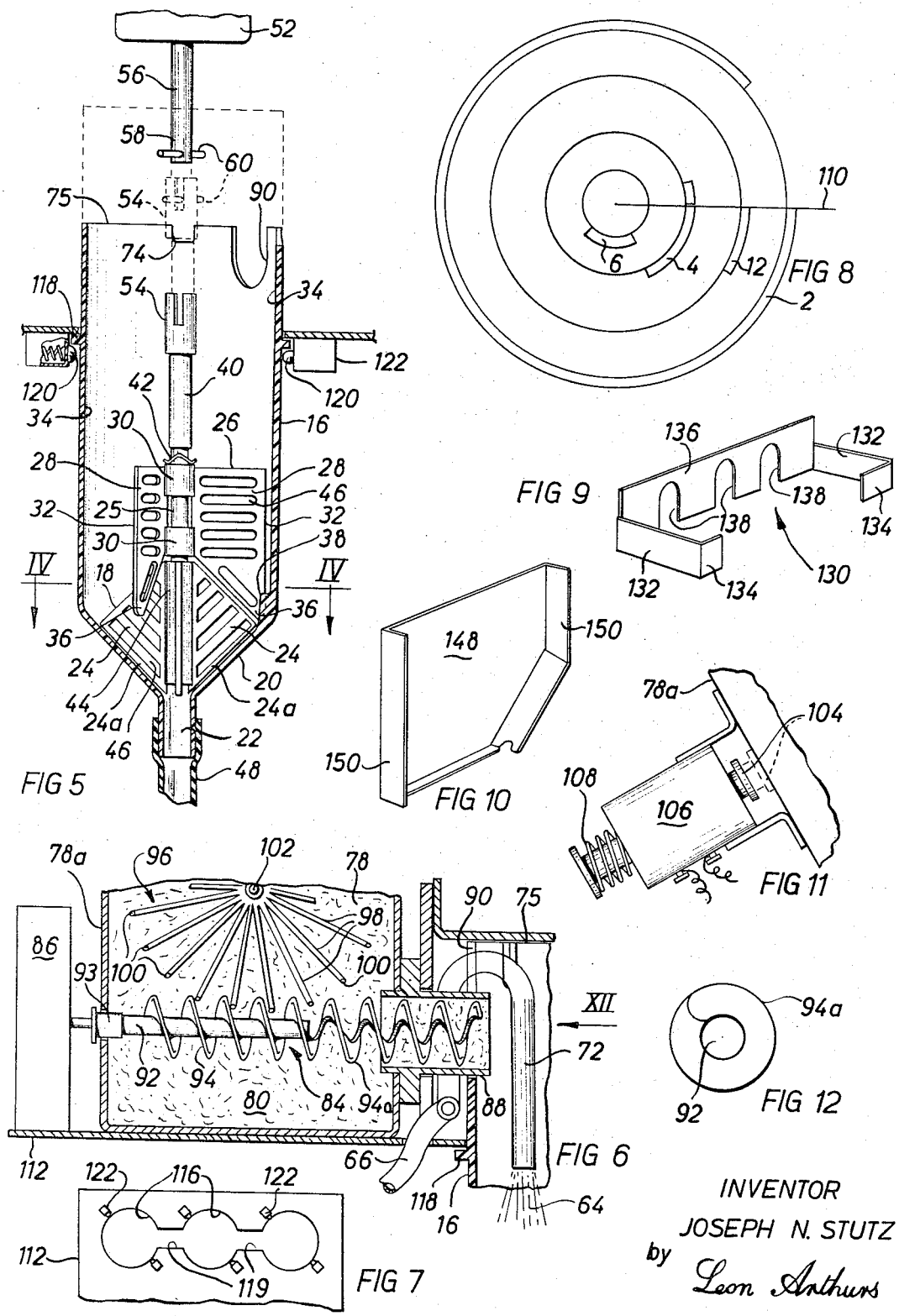

3,335,911
BEVERAGE BLENDING MACHINERY
Joseph N. Stutz, Toronto, Ontario, Canada, assignor to Canadian Vendbar Industries Limited, Toronto, Ontario, Canada, a corporation of Canada
Filed Apr. 13, 1965, Ser. No. 447,721
14 Claims. (Cl. 222—70)

The present invention relates to automatic machinery—usually, although not necessarily, coin operated—for preparing and delivering beverages, particularly cold beverages produced by dispersing a dry concentrate in a refrigerated liquid such as water.

Apparatus of this type is described and claimed in copending application S.N. 237,640 for Automatic Beverage Dispensing Machinery filed November 14, 1962, now Patent No. 3,236,570 of Feb. 22, 1966, to which reference may be made for an extensive survey of the advantages arising from the use of a dry rather than a liquid concentrate in the preparation of cold beverages and of the problems involved in preparing cold beverages in this manner.

Suffice it to say in the present instance that whereas it is generally acknowledged that dry concentrates are more desirable for use in automatic machines from the points of view of cleanliness, sanitation, stability, and preservation it is nevertheless difficult to achieve an adequate or even acceptable dispersion of a dry concentrate in a cold liquid in the limited time dictated by economic considerations applicable to automatic vending apparatus.

For the sake of clarity, it should be pointed out that in this preferred embodiment of the invention, the dry concentrate or beverage base visualized is provided in a granular, powdery, or like comminuted and reduced state. For simplicity, such state is hereinafter generically referred to as powdered; the substance itself being referred to as a powder. Moreover, but also only for the sake of clarity and simplicity, water may sometimes be referred to as the specific liquid vehicle in which said powders are dispersed to form a beverage but this is subject to the understanding that the term water as used herein comprehends as well all other liquids which serve the same purpose. It will be appreciated that the powders herein contemplated may contain a high percentage of particles which do not dissolve but which are held, whether desirably or necessarily, in suspension in the ultimate beverage.

The broad objects of this invention are generally the same as those of the invention disclosed in my copending application aforesaid, namely:

To provide improved machinery for preparing and dispensing powder-based beverages at relatively high speed, to provide machinery which is capable, amongst other things, of producing commercially acceptable cold beverages prepared by the dispersion of a powdered base in refrigerated water, and to provide improved apparatus for dispensing powders as well as improved mechanism for mixing or blending them with refrigerated water in machinery of the contemplated type.

It is a further object of the present invention to provide in machinery as aforesaid an improved blender operable to disperse beverage powder in a liquid powder in a liquid and to stir virogously or turbulate said liquid and powder during the blending thereof.

It is a further object of the invention to provide in machinery as aforesaid an improved beverage blender of simple and hygienic construction from which the contents are speedily dischargeable as soon as they have been blended.

It is a further object of the invention to provide an improved blender as aforesaid in which the contents are retainable by centrifugal force and from which they are dischargeable by gravity.

It is a further object of the invention to provide an improved blender as aforesaid wherein the centrifugal force is generated by means which also serve to turbulate the blender contents for dispersing beverage powder in the liquid.

It is a further object of the invention to provide an improved blender as aforesaid wherein the retaining effect of said centrifugal force generating means is enhanced by shaping of the blender.

It is a further object of the invention to provide an improved blender as aforesaid wherein turbulence of said contents is procured by means of a member disposed within and rotatable relative to a bowl which receives said contents, said member having both a stirring and a pumping action on the bowl contents.

It is a further object of the invention to provide machinery as aforesaid operable through a blending cycle the stages of which are timed to procure thorough dispersion of a beverage powder in a liquid and discharge of the blended beverage from the blender in a very short time.

It is a further object of the invention to provide machinery as aforesaid wherein by suitable timing of said blending cycle liquid may be delivered to a blender bowl including a permanently open bottom outlet and retained therein until blending thereof with a beverage powder has been achieved.

It is a further object of the invention to provide machinery capable of producing cold frothy beverages of the kind exemplified by the conventional milk shake and it is, therefore, a related object of the invention to provide in such machinery a blender as aforesaid in which the contents may be brought to the high degree of turbulence requisite for this operation.

It is a further object to provide hygienic beverage dispensing machinery which can be quickly dismantled for cleaning and servicing and it is a related object to provide in such machinery drive means for a blender which can be readily and easily disengaged from the blender for inspection and maintenance purposes.

It is a further object of the invention to provide in machinery as aforesaid a container for dry powder beverage base and improved means for delivering a measured quantity of powder from said container to a blender, and it is also an object to provide means for loosening the powder within such container to procure a constant gravity feed to the delivery means and to prevent "bridging" of the powder.

It is a further object of the invention to provide in machinery as aforesaid as improved auger-type powder delivery means capable of delivering a relatively large quantity of powder by relatively few rotations.

It is a still further object of the invention to provide machinery as aforesaid equipped with means for refrigerating liquid before it is delivered to a blender and also to provide in such machinery a cooled chamber within which the blending operation is effected.

The foregoing and other objects are achieved in accordance with the invention by the provision of apparatus for blending a beverage powder in a liquid comprising a blender operable to stir vigorously or turbulate liquid contained therein. The stirring may be, and is preferably, achieved by a beater disposed within an ingredient-receiving bowl—both beater and bowl forming parts of the blender. The apparatus also comprises delivery means for liquid and powder to the blender and a timer for regulating the operation of the blender and the delivery means. The timer is adjusted to procure operation of the blender and delivery of liquid thereto for turbulation before delivery of the powder thereto, and thereafter until the liquid and powder are blended.

Other objects, advantages and features of the invention will be more particularly set forth or will be apparent from the ensuing illustrative description of a preferred embodiment thereof which is shown in the accompanying drawings, wherein:

FIG. 1 is a front elevation partly broken away of an automatic beverage blending machine containing blending apparatus in accordance with the invention, the front of the machine cabinet having been removed to reveal the internal mechanism;

FIG. 2 is a partially exploded diagrammatic perspective view showing the apparatus of the invention;

FIG. 3 is a section on the line III—III of FIG. 1;

FIG. 4 is a section on the line IV—IV of FIG. 5;

FIG. 5 is a section on the line V—V of FIG. 2;

FIG. 6 is a fragmentary sectional view showing in assembled relation certain of the parts illustrated in FIG. 2;

FIG. 7 is a fragmentary bottom plan view of a rack illustrated in FIG. 1;

FIG. 8 is a diagram illustrating the operative cycle of the machine shown in FIG. 1;

FIGS. 9 and 10 are isolated perspective views of parts shown in assembled condition in FIGS. 1 and 3;

FIG. 11 is a side elevation of an electromagnetic hammer which may be incorporated in the apparatus of the invention, and FIG. 12 is an end view in the direction of the arrow XII of FIG. 6 of an auger which may be incorporated in the apparatus of the invention.

The beverage blending apparatus in accordance with the invention is illustrated somewhat diagrammatically in FIG. 2.

As shown the apparatus comprises a blender 2 which is operable to turbulate liquid contained therein. Delivery means 4 is provided for delivering liquid—in this case refrigerated water—to the blender 2 and dry beverage powder is supplied to the blender by delivery means 6.

The blender 2 and delivery means 4 and 6 will be described in greater detail hereinafter, but at this stage it should be noted that the apparatus includes also a timer 8 which regulates the operation of the blender 2 and delivery means 4 and 6 and which is adjusted to procure operation of the blender 2 and consequent stirring or turbulation of liquid contained therein before the beverage powder is delivered to the blender whereby said powder is discharged into and rapidly dispersed in the turbulent liquid. When the contents of the blender 2 have been thoroughly blended—which is achieved in a very short time—the timer 8 terminates operation of the blender.

It will be appreciated that the apparatus of the invention is intended primarily for embodiment in an automatic beverage vending machine and that such a machine may be arranged to vend a plurality of different beverages. Part of the mechanism of such a machine is illustrated in FIG. 1 which is a front elevation of the upper part of an automatic beverage vending machine cabinet 10 with the front or door removed, said vending machine being generally designated by the reference numeral 11.

The cabinet 10 in the present example houses three assemblies of the kind shown in FIG. 2. That is to say it contains three blenders 2, three liquid delivery means 4 and three powder delivery means 6, although the operation of the several assemblies is controlled by a single timer 8 and the liquid delivery means 4 may be combined to some extent as will appear hereinafter. The cabinet 10 also houses a device 12 which may be controlled by the timer 8, for depositing a disposable drinking cup 14 on a platform 15 where it can receive the beverage blended in any of the blenders 2. The device 12 may be of conventional character, such devices being very well known in the art, and requires no further description herein. The platform 15 is preferably perforated in accordance with usual practice to pass spillage to a waste bucket 17. It is contemplated that the machine 11 also comprises various other conventional components which are not shown in the drawings, some of which may be mounted on the door of cabinet 10. For example coin-receiving mechanism and beverage selector device may be provided, the latter being connected in selector circuits for determining which of the beverage-preparing assemblies is to be put to use.

The general arrangement of the apparatus of the invention having been set forth it is now expedient to consider in mode detail the structure of the various elements in said apparatus.

As shown in FIGS. 2, 4 and 5 the blender 2 includes a bowl 16 and a beater 18. The bowl 16 is generally cylindrical and includes a base 20 provided with an outlet 22 through which the bowl contents are dischargeable by gravity. The bowl base 20 and the beater 18 are shaped and cooperable in a manner to be described to retain substantially the whole of the said contents within the bowl 16 during operation of the blender, notwithstanding that the outlet 22 has no closure and remains permanently open.

Specifically the base 20 has a generally conical configuration with the apex thereof forming the bottom extremity of the bowl 16 and with the outlet 22 disposed at said apex. The beater 18 has a plurality of radial beating vanes 24 mounted on a shaft 25 rotatably and co-axially mounted in the bowl 16. The outer edges 24a of vanes 24 conform to the configuration o fthe base 20 and in operation describe an orbit about the axis of the base 20 wherein they approach closely to said base as shown in FIG. 5.

Also disposed within the bowl 16 is a baffle 26 which serves as a mount for the beater 18. The baffle 26 may have three vanes 28 radiating from a pair of short central tubes 30. The vanes 28 and tubes 30 may be formed of corrosion-resistant material such as stainless steel, the tubes being provided with nylon bushes to afford bearings for the beater shaft 25 which is also preferably of stainless steel.

The baffle 26 is a snug fit within the bowl 16 but is sufficiently loose therein to be readily withdrawn for cleaning or replacement. As shown in FIG. 5 each vane 28 may include an edge 32 substantially parallel with the cylindrical wall 34 of the bowl 16 and a more or less pointed lower tip 36 which rests on the conical base 20 and vertically locates the baffle within the bowl 16. Rotational movement of the baffle 26 within the bowl 16 during operation of the blender is restricted by an abutment such as a vertical rib 38 integral with the bowl wall 34.

The beater 18 is positioned vertically within the bowl 16 by means of a sleeve 40, which may be of nylon, frictionally fitted over the upper end of the beater shaft 25. The lower end of the sleeve 40 engages an antifriction washer 42 interposed between said sleeve and the upper baffle tube 30 and is adjusted relative to the shaft 25 so as to support the beater vane edges 24a closely adjacent to the bowl base 20 but spaced sufficiently therefrom to prevent the accumulation of sediment between said edges and base.

The beater vanes 24 may be formed of an inert substance such as nylon and may radiate from a central nave 44 fitted over the lower end of the shaft 25. Preferably the beater vanes 24 and the baffle vanes 28 are perforated as by slots 46 to procure a pumping effect as will appear.

In operation a driver is coupled to the beater 18 which is rapidly rotated relative to the bowl 16 and baffle 26. Liquid introduced into the bowl 16 by the delivery means 4 strikes the rotating beater 18 and is flung centrifugally outwards by the vanes 24 thereof. The liquid at the bottom of the bowl 16 is thus urged continuously outwards against the conical base 20 which is believed to exert a camming action on the liquid to bias it away from the open outlet 22. The shaping of the base 20 and the rotational speed of the beater 18 are choosen so as to procure retention of substantially the whole of the bowl contents therewithin until rotation of the beater ceases.

As the beater 18 is rotated it generates, as well as the centrifugal action above noted, a vigorous stirring of the bowl contents. It will be readily understood that the turbulence caused by this stirring conduces to a very rapid dispersion of beverage powder in the liquid in the bowl 16. The turbulence is greatly enhanced by the action of the baffle 26 which impedes the free motion of liquid immediately above the beater vanes 24 and causes powerful eddies therein. The slots 46 in the vanes 24 and 28 from constrictions through which the liquid may be said to be pumped further to increase its turbulence during rotation of the beater 18.

As previously mentioned the beverage powder is introduced into the bowl 16 after stirring of the liquid in the bowl has begun, and is consequently very quickly dispersed in the liquid.

After a predetermined period during which the bowl contents are reduced to a more or less homogeneous consistency rotation of the beater 18 is arrested. Since the liquid in the bottom of the bowl 16 is no longer subjected to the centrifugal action described above it is free to discharge through the outlet 22 and immediately does so, followed by the remainder of the bowl contents.

The outlet 22 may be connected by flexible hose 48 to a spout 50 located above the platform 15 on which a drinking cup is deposited by the device 10.

In the present embodiment the driver for the beater 18 comprises an electric motor 52 couplable to the beater and forming a part of the blender 2. The motor 52 and the beater 18 may be provided with mating parts movable between drivingly engaged and disengaged positions to permit either the motor or the blender 2 to be dismounted from the apparatus separately.

As shown the sleeve 40 is provided with an enlarged and transversely grooved upper end 54 forming one of the mating parts aforesaid, and the motor 52 has a drive shaft 56 normally projecting downwards and having a lower end 58 provided with short radial arms 60 which constitutes the other of said mating parts. The lower end 58 of the shaft 56 is insertable within the enlarged sleeve end 54 with the arms 60 engaged in the transverse groove therein as shown in FIG. 5 to prevent relative rotation between said shaft and sleeve ends 58 and 54 when the motor 52 is energised, but permitting axial separation of said ends when the motor 52 is at rest.

It will be noted that in their drivingly engaged operative positions the shaft and sleeve ends 58 and 54 are both disposed within the bowl 16. To facilitate bringing of the ends into engagement with each other the bowl 16 is preferably formed of transparent material such as a tough plastic which permits inspection of said ends as they are moved manually between disengaged and engaged positions shown respectively in full and broken lines in FIG. 5.

Turning now to the liquid delivery means 4 it will be seen that in the present embodiment this includes a reservoir 62 for liquid, such as water 64, piping 66 communicating at opposite ends with the reservoir 62 and the bowl 16, and a valve 68 in said piping. The reservoir 62 may be replenished through an inlet pipe 70 coupled to an external mains water supply. Although other means may be used to procure flow of water from the reservoir 62 through piping 66 to the bowl 16 when the valve 68 is opened it has been found convenient and expeditious to utilise the mains water pressure transmitted via the inlet pipe 70 to force water from the reservoir 62 along the piping 66. Accordingly a valve 69 is provided in the inlet pipe 70 which valve 69 is normally closed to isolate the reservoir 62 from the effects of said pressure. The valve 69 may be solenoid-operated and is preferably opened before the commencement of an operative cycle of the blending apparatus, for instance when a coin is inserted in the vending machine 11, and closed after the completion of said cycle by the action of a relay. When the valve 68 is opened in the course of said cycle, water 64 is formed out of the reservoir 62 by the incoming water supplied via the inlet pipe 70 and passes through the piping 66 to the bowl 16. It is noteworthy that by this means the reservoir 62 is continuously maintained in full condition. The piping 66 may terminate at the end thereof remote from the reservoir 62 in a pair of nozzles 72 which when the various parts are assembled project through cut-outs 74 in the upper edge 75 of the bowl 16. The valve 68 is controlled by the timer 8.

The reservoir 62 may embody a refrigerating device which chills the water 64 contained therein before it is delivered to the blender 2. In the machine 11 the reservoir 62 embodying such refrigerating device is housed in an insulated compartment 76 to the rear of the bowls 16, the reservoir being connected to three sets of piping 66 respectively supplying water to the three blenders 2.

The powder delivery means 6 in its presently preferred form is shown best in FIGS. 2, 6 and 12. A bin or hopper 78 is provided for the beverage powder 80 and may include a lid removable to permit inspection and replenishing of the bin contents. In FIG. 1 a single lid 82 is shown closing all three bins 78. The bin 78 also includes at its lower end a horizontally extending nozzle 88 which when the parts are assembled communicates with the bowl 16 and projects through a cut-out 90 in the upper edge thereof.

An auger 84 is rotatably mounted substantially horizontally within the bin 78 at its bottom end and is rotatable by a motor 86 controlled by the timer 8. The auger 84 preferably comprises an axial shaft 92 and a helical fin 94 secured to and partially embracing the said shaft. The fin 94 has a portion 94a projecting beyond the shaft 92 and defining a hollow lumen. This projecting helical fin portion 94a extends into the nozzle 88 which forms a bearing for the auger. The auger shaft 92 carries a flanged plastic collar 93 which is journalled in the rear wall 78a of the bin 78. In operation when the auger 84 is rotated by the motor 86 the fin 94 feeds powder 80 from the bottom of the bin 78 horizontally into and through the nozzle 88 and discharges it into the bowl 16. Obviously for a predetermined number of revolutions of the auger a predetermined, measured quantity of powder 80 will be dispensed into the bowl 16.

The fin portion 94a has been found especially advantageous in use since the hollow lumen defined thereby becomes occupied by powder 80 some at least of which is carried along with the powder directly fed by the fin itself and discharged into the bowl 16, whereby a single revolution of the auger 84 is capable of feeding a substantially greater quantity of powder 80 than would be the case if the shaft 92 extended the full length of the fin 94. Consequently relatively few rotations of the auger suffice to dispense the required quantity of powder 80 from the bin 78 into the bowl 16, which feature in turn inhibits undue wear on the bearing surfaces supporting the auger.

To prevent compacting of the powder 80 in the lower part of the bin 78 an agitator 96 may be provided. The agitator 96 is in the form of a spider having radial arms 98 and parallel arms 100 attached to said radial arms in perpendicular relation thereto. The agitator 96 includes an axle 102 by which it is rotatably mounted within the bin 78 and is disposed so that the parallel arms 100 thereof extend horizontally with the lowermost engaging between adjacent convolutions of the helical fin 94. As the auger 84 rotates it functions in the manner of a worm wheel with respect to the agitator 96 and causes rotation thereof in the powder 80.

As an additional precaution against compacting and "bridging" of the powder 80 in the bin 78 a hammer 104 may be arranged to strike the rear wall 78a of the bin at the commencement of a cycle of operations and thereby vibrate the bin and its contents. As shown in FIG.

11 the hammer 104 is carried by the armature of a solenoid 106 mounted on the wall 78a, the solenoid being energised to cause the hammer to strike the wall. The hammer may be returned by gravity or by a spring 108. The vibration effected by the hammer 104 is so vigorous that where several bins 78 are disposed in contiguity with each other as shown in FIG. 1 it is sufficient if only one of the bins is equipped with such a hammer since the vibrations are quickly communicated from the actual bin struck to the other bins.

The timer 8 is of known type comprising a motor driven shaft on which a plurality of cams is mounted, each of said cams operating a microswitch in a control circuit. Its operation can best be understood by an examination of FIG. 8 which is a phase diagram illustrating a single operative cycle of the apparatus of the invention incorporated in the vending machine 11.

FIG. 8 contains four concentric circles each denoting the duration of a complete cycle. Each circle is assigned to one of the elements of the apparatus and is designated by the reference numeral appropriate to said element. On each circle an arc, emphasised by parallel lines, denotes the duration of the "on" time of that element as well as its position in the whole cycle. The diagram should be read in the clockwise direction from the line 110 which denotes the commencement of a cycle, and the times shown are approximate only.

It will thus be seen that the blender 2 runs throughout the greater part of the operative cycle of the present machine whereas the device 12 controlling deposit of a drinking cup 14 starts contemporaneously with the cycle but may stop almost immediately thereafter having discharged its function.

Also contemporaneously with the start of the cycle the valve 68 of the liquid delivery means 4 is opened and water 64 is delivered to the bowl 16, said water being immediately turbulated by the beater 18 as previously described. Before the valve 68 is closed the motor 86 of the powder delivery means 6 is energised and a quantity of powder 80 is dispensed into the turbulent liquid within the bowl 16. The delivery of powder may continue for a short period after the valve 68 has been closed.

When thorough blending of the contents of the bowl 16 has been achieved operation of the blender 2 is arrested and after a pause during which said blended contents are substantially wholly discharged through the outlet 22 in the bowl 16 the valve 68 of the liquid delivery means 4 is again briefly opened to deliver a small quantity of water to the bowl 16 for the purpose of flushing the bowl 16 and beater 18 and preventing an accumulation of sediment therein.

It will be understood that each of the circles in FIG. 8 may also represent diagrammatically one of the cams of the timer 8, the parallel-line arc constituting the high portion of said cam. In actual fact, however, the timer 8 may include additional cams controlling the individual motors 86 of the three powder delivery means 6 since it may be necessary to energise each of said motors for a period of different duration.

Operation of the hammer 104 may be included in the blending cycle and may be controlled by the timer 8 to take place before the energisation of the motor 86 of the powder delivery means 6. However since, as noted above, a single hammer 104 may serve to vibrate several bins 78 it has been found more convenient to actuate the hammer 104 before the blending cycle commences and in the present instance insertion of a coin in the vending machine 11 procures actuation of the hammer, the above described operative cycle being initiated when a beverage selector button (not shown) has been pressed to determine which of the three blending assemblies is to be utilized.

To complete the description of the invention various other features of the machine 11 should be noticed. As shown especially in FIGS. 3, 5 and 6 the bowls 16 are detachably mounted in a rack 112 which also serves to support the bins 78 and the auger motors 86 and which is fixedly mounted in the cabinet 10. The rack 112 includes three circular apertures 116, FIG. 7, of slightly larger diameter than that of the bowls 16 and each bowl 16 is inserted in an aperture 116 from below until an annular flange 118 on the bowl engages the underside of the rack and prevents further upward movement. For a purpose which will appear, the apertures 116 are interconnected by broad slots 119 in the rack 112.

Releasable retaining means is provided for holding the bowls in this position and an example of one type of retaining means is shown in FIGS. 5 and 7, said means comprising a pair of spring-biased balls 120 associated with each aperture 116 which snap into place below the flange 118 when the latter engages the underside of the rack as described above. The balls 120 may be carried in housings 122 secured to the rack 112 in diametrically opposed positions at the edge of the aperture 116.

The beater motors 52 are mounted above the bowls 16 on a support 124 hinged to the cabinet 10 at 126, FIG. 1, and are enclosed by a removable cover 127. In operative position the support 124 is restrained against swinging on the hinge 126 by detent means not shown. The support is perforated to pass the motor drive shafts 56 which depend therefrom into the bowls 16 for engagement with the beaters 18 as previously described. As shown in FIG. 3 the upper edge 75 of each bowl 16 abuts against the underside of the support 124 which, in effect, constitutes a closure for the bowl. The hinge 126 may be constructed to permit some degree of upward movement of the support 124 in order to clear the motor drive shafts 56 from the rack 112 before the support is swung outwards from the cabinet 10 to facilitate inspection and/or maintenance of the motors 52. In FIG. 3 the support 124 is shown in broken lines in an outwardly swung position.

The support 124 carries depending from its front edge an elongated strip 128 which is preferably transparent as illustrated and which in the operative position of the support engages the rack 112 with its lower edge. In its operative position, as illustrated best in FIG. 3, the support 124 also abuts against and is to some extent supported by a roughly U-shaped member 130 which is shown in isolation in FIG. 9. The member 130 includes a pair of legs 132 having inturned ends 134, and a bight 136 which is somewhat deeper than the legs 132 and which has three recesses 138 in its lower edge. The member 130 is removably disposed on the upper surface of the rack 112 with the recesses 138 fitting over the nozzles 88 and also over the three sets of piping 66 and with the legs 132 extending in the front to rear direction of the cabinet 10. The upper edges of the legs 132 engage the underside of the support 124 while the rear side of the latter abuts against the upper margin of the bight 136 and the strip 128 abuts against the leg ends 134.

The insulated compartment 76 has a front plate 140 vented at 142 and lying immediately behind the bowls 16 as shown in FIG. 3. The plate 140 extends up to and abuts against the underside of the rack 112.

The cup receiving platform 15 is provided with a canopy 144 having a hole 146 therein in which the three spouts 50 are mounted, by welding for example.

A removable screen 148, shown partially broken away in FIG. 1, in section in FIG. 3 and in perspective in FIG. 10, is installed in front of the bowls 16 and extends from the rack 112 to the canopy 144. The screen 148 includes end walls 150 which are frictionally held by retainers 152 on the front plate 140 of the chamber 76. The retainers 152 may be narrow metal fillets arranged perpendicularly to the surface of the plate 140.

As clearly shown in FIG. 3 the bowls 16 and nozzles 72 and 88 are housed in a chamber 154 defined by an enclosure consisting of the plate 140, the U-shaped member 130, the motor support 124, the strip 128, the screen 148 and the canopy 144. Communication between the upper and lower parts of the chamber 154 is established through the slots 119 in the rack 112.

To pre-cool the bowls 16, which of course inhibits unwanted heating of the contents during blending, and also for hygienic reasons the chamber 154 is maintained at a low temperature by a current of cool air issuing through the vent 142 in the front plate 140 of the insulated cooler compartments 76. Said air current is indicated by the arrows in FIG. 3 and as shown in that figure circulates round the chamber 154 before leaving it via the hole 146. Owing to the circulation of cool air therein the chamber 154 is kept at a temperature substantially below the ambient.

The above-described cool-air current is generated by mechanism which effects constant recirculation of the air in the interior of the cabinet 10 through the insulated compartment 76 which also houses an air-cooler, a finned evaporator coil 156 forming part of said air cooler being disposed across the vent 142. Said mechanism may include an intake 158 and a motor-driven fan 160 by which air is drawn from the main part of the cabinet 10 which houses the bins 78 into the insulated compartment 76 where it is dehumidified and cooled before escaping as a cool air current through the vent 142. In the chamber 76 moisture from the air condenses on the cold metal surfaces therein and subsequently gravitates through a small drain tube 162 into the waste bucket 17. This recirculation of air in the interior of the cabinet 10 has the important effect of keeping humidity within the cabinet continuously at a very low level whereby absorption of air-borne moisture by the powder within the bins 78 and consequent caking thereof are reduced to a minimum. It will be understood that the fan 160 is continuously driven as long as the machine 11 is in operating condition.

It will be appreciated, of course, that the machine 11 is but one example of a machine in which the apparatus of the invention may be embodied and that more or less than three blenders 2 and their associated liquid and powder delivery means may be incorporated in such a machine.

It will also be understood that whereas one embodiment of the invention has been described herein for illustrative purposes many changes and modifications in said embodiment will immediately suggest themselves to a person skilled in the art to which the invention relates and it is intended that the invention should embrace all such changes and modifications as fall within the scope of the claims now following.

What I claim is:

1. Apparatus for blending a beverage powder in a liquid comprising:
    a blender in which the liquid and powder are blended provide a beverage;
    a bowl forming part of said blender for receiving said liquid and powder;
    means for delivering said liquid and said powder to said bowl;
    each of said delivery means including a discharge nozzle communicating with said bowl;
    a beater forming part of said blender and disposed within said bowl for turbulating and blending the contents thereof during operation of said blender;
    a driver for said beater;
    a timer regulating actuation of said driver and delivery of said liquid and said powder to said bowl by said means;
    a chamber-defining enclosure surrounding said bowl and said nozzles;
    mechanism for generating a current of air through the chamber defined by said enclosure, and
    an air-cooler positioned to cool said current of air before it enters said chamber.

2. Apparatus as claimed in claim 1 wherein:
    said liquid delivery means includes a reservoir for said liquid;
    a refrigerating device being positioned to cool the liquid within said reservoir.

3. Apparatus for blending a beverage powder in a liquid comprising:
    a bowl within which said beverage powder and liquid are blendable, the bowl having a permanently open outlet through which its contents are dischargable by gravity;
    means for delivering said beverage powder and liquid to said bowl, said means being separately operable permitting delivery of liquid to the bowl before and after the delivery of the beverage powder thereto, and
    a beater in said bowl above said opening operable to turbulate said contents for the blending thereof and to impart rotary motion thereto for procuring retention of said contents in said bowl by rotary forces to inhibit discharge thereof through said outlet while the beater is being operated as aforesaid;
    the beater permitting such discharge when it is not so operated.

4. Apparatus as claimed in claim 3 wherein:
    said bowl has a base containing said permanently open outlet;
    said bowl base being generally conical with the apex thereof forming the bottom extremity of said bowl, said outlet being disposed at said apex;
    said beater having radial beating vanes with outer edges which conform to the configuration of said base and are spaced closely adjacent to said base;
    said beater vanes being rotatable about the axis of said base in an orbit in which said conforming vane edges approach closely to said conical base.

5. Apparatus as claimed in claim 3 wherein:
    said bowl includes a baffle disposed to impede the free movement of the liquid within said bowl and so to enhance its turbulence when the beater is in operation.

6. Apparatus as claimed in claim 5 wherein:
    said baffle and said beater have perforated radial vanes.

7. Apparatus as claimed in claim 3 wherein:
    said bowl includes a baffle which is stationary relative thereto and disposed to impede the free movement of the liquid within said bowl and so to enhance its turbulence when the beater is in operation;
    said beater being co-axial with and rotatable relative to said bowl and said baffle, and being disposed between the base of said bowl and said baffle;
    said bowl base and said beater being shaped and cooperable to impart said rotary motion to the liquid when the beater is in operation.

8. Apparatus as claimed in claim 7 wherein:
    said beater is of substantial diameter; said bowl closely surrounds said beater, and said outlet is co-axial with said beater and bowl, and is of relatively small area.

9. Apparatus as claimed in claim 3 including:
    a motor couplable to said beater for procuring rotation thereof;
    said motor and said beater respectively including parts movable between drivingly engaged and disengaged positions relative to each other permitting separate removal of said beater from said blender with said parts in their disengaged position.

10. Apparatus as claimed in claim 3 including:
    a motor couplable to said beater for procuring rotation thereof;
    said motor and said beater respectively including parts normally located within said bowl and movable between drivingly engaged and disengaged positions relative to each other permitting separate removal of said beater with said parts in their disengaged position;
    said bowl being formed of transparent plastic to permit inspection of said parts during movement thereof between the positions aforesaid.

11. Apparatus as claimed in claim 3 further comprising:
   a container for beverage powder, and
   an auger within said container rotatable to deliver a measured quantity of said powder from said container to said bowl,
   said auger including an axial shaft and a helical fin partially embracing said shaft;
   said fin having a portion projecting beyond said shaft in the direction of said bowl and defining a hollow lumen.

12. Apparatus as claimed in claim 3 further comprising:
   a container for said beverage powder;
   dispensing means operable to deliver a measured quantity of said powder from said container to said bowl;
   a hammer actuable to strike said container to loosen the powder therein, and
   mechanism arranged to actuate said hammer at least once during each cycle of the apparatus.

13. Apparatus as claimed in claim 3 further comprising:
   a container for said beverage powder;
   an auger within said container rotatable to deliver a measured quantity of said powder from said container to said bowl;
   said auger including an axial shaft and a helical fin partially embracing said shaft;
   said fin having a portion projecting beyond said shaft in the direction of said bowl and defining a hollow lumen;
   a hammer actuable to strike said container to loosen the powder therein, and
   mechanism arranged to actuate said hammer at least once during each cycle of the apparatus.

14. Apparatus as claimed in claim 3, including:
   a reservoir for the liquid, and a refrigerating device positioned to cool the liquid within said reservoir.

References Cited

UNITED STATES PATENTS

| | | | |
|---|---|---|---|
| 1,585,169 | 5/1926 | Perkins et al | 259—43 |
| 1,791,169 | 2/1931 | Schuchardt | 259—43 |
| 2,204,097 | 6/1940 | Montgomery | 222—202 X |
| 2,464,588 | 3/1949 | Knudsen et al. | 259—44 X |
| 2,621,838 | 12/1952 | Price | 222—129.4 |
| 2,753,089 | 7/1956 | Phillips | 222—413 X |
| 2,755,000 | 7/1956 | Parre | 222—129.4 |
| 2,796,200 | 6/1957 | Lambert et al. | 222—129.4 |
| 3,152,728 | 10/1964 | McCarter | 222—146 X |
| 3,178,066 | 4/1965 | Martin | 222—413 X |
| 3,235,270 | 2/1966 | Stutz | 222—129.4 |

FOREIGN PATENTS 327,984   4/1930   Great Britain.

ROBERT B. REEVES, *Primary Examiner.*

HADD S. LANE, *Examiner.*